United States Patent
Shimanuki et al.

(10) Patent No.: US 10,756,337 B2
(45) Date of Patent: Aug. 25, 2020

(54) LITHIUM ION SECONDARY BATTERY

(71) Applicant: NEC Corporation, Tokyo (JP)

(72) Inventors: Ikiko Shimanuki, Tokyo (JP); Suguru Tamai, Tokyo (JP); Daisuke Kawasaki, Tokyo (JP); Hitoshi Ishikawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 126 days.

(21) Appl. No.: 15/779,660

(22) PCT Filed: Nov. 29, 2016

(86) PCT No.: PCT/JP2016/085387
§ 371 (c)(1),
(2) Date: May 29, 2018

(87) PCT Pub. No.: WO2017/094712
PCT Pub. Date: Jun. 8, 2017

(65) Prior Publication Data
US 2018/0358610 A1    Dec. 13, 2018

(30) Foreign Application Priority Data
Nov. 30, 2015 (JP) .................................. 2015-232736

(51) Int. Cl.
H01M 4/36   (2006.01)
H01M 4/38   (2006.01)
(Continued)

(52) U.S. Cl.
CPC ............ *H01M 4/364* (2013.01); *H01M 4/386* (2013.01); *H01M 4/483* (2013.01); *H01M 4/622* (2013.01);
(Continued)

(58) Field of Classification Search
CPC ............ H01M 4/36; H01M 4/38; H01M 4/62; H01M 10/0525
See application file for complete search history.

(56) References Cited

U.S. PATENT DOCUMENTS

| | | | |
|---|---|---|---|
| 2009/0053606 A1* | 2/2009 | Kim | H01M 4/48 |
| | | | 429/231.8 |
| 2009/0061325 A1 | 3/2009 | Odani et al. | |

(Continued)

FOREIGN PATENT DOCUMENTS

| | | |
|---|---|---|
| JP | 08-203499 A | 8/1996 |
| JP | 11-067215 A | 3/1999 |

(Continued)

OTHER PUBLICATIONS

Communication dated May 31, 2019, from the European Patent Office in counterpart European Application No. 16870649.7.

(Continued)

*Primary Examiner* — Kenneth J Douyette
(74) *Attorney, Agent, or Firm* — Sughrue Mion, PLLC

(57) ABSTRACT

When the particle size of a silicon material used for a negative electrode active material are small, a large surface area thereof easily causes a side reaction between the active material and an electrolyte solvent to occur, and the cycle characteristics of a lithium ion secondary battery decrease. In order to improve the cycle characteristics, a lithium ion secondary battery according to the present invention is characterized in comprising a negative electrode comprising a material comprising silicon as a constituent element and a polyacrylic acid, and an electrolyte solution comprising a fluoroethylene carbonate, wherein the 50% particle size of the material comprising silicon as a constituent element is 2 μm or less.

14 Claims, 1 Drawing Sheet

(51) Int. Cl.

| | | |
|---|---|---|
| *H01M 4/48* | (2010.01) | |
| *H01M 10/0525* | (2010.01) | |
| *H01M 10/0567* | (2010.01) | |
| *H01M 10/0569* | (2010.01) | |
| *H01M 10/058* | (2010.01) | |
| *H01M 4/62* | (2006.01) | |
| *H01M 4/02* | (2006.01) | |

(52) U.S. Cl.
   CPC ..... *H01M 10/058* (2013.01); *H01M 10/0525* (2013.01); *H01M 10/0567* (2013.01); *H01M 10/0569* (2013.01); *H01M 2004/021* (2013.01); *H01M 2004/027* (2013.01); *Y02E 60/122* (2013.01); *Y02T 10/7011* (2013.01)

(56) References Cited

U.S. PATENT DOCUMENTS

| | | |
|---|---|---|
| 2014/0087250 A1 | 3/2014 | Coowar et al. |
| 2015/0132643 A1 | 5/2015 | Sasaki |
| 2015/0155597 A1 | 6/2015 | Ishikawa et al. |
| 2015/0303456 A1* | 10/2015 | Yoo ................ H01M 4/364 429/217 |
| 2016/0190552 A1 | 6/2016 | Murata et al. |
| 2016/0240843 A1 | 8/2016 | Kamo et al. |
| 2016/0351947 A1 | 12/2016 | Kamo et al. |

FOREIGN PATENT DOCUMENTS

| | | |
|---|---|---|
| JP | 11-238505 A | 8/1999 |
| JP | 2007-242405 A | 9/2007 |
| JP | 2007-273355 A | 10/2007 |
| JP | 2010-146871 A | 7/2010 |
| JP | 2011-086503 A | 4/2011 |
| JP | 2013-008586 A | 1/2013 |
| JP | 2014-164871 A | 9/2014 |
| JP | 2015-191876 A | 11/2015 |
| JP | 2016-152077 A | 8/2016 |
| WO | 2006/075446 A1 | 7/2006 |
| WO | 2013/161786 A1 | 7/2006 |
| WO | 2013/161786 A1 | 10/2013 |
| WO | 2014/003077 A1 | 1/2014 |
| WO | 2014/024823 A1 | 2/2014 |
| WO | 2015/019994 A1 | 2/2015 |
| WO | 2015/118846 A1 | 8/2015 |
| WO | 2015/122498 A1 | 8/2015 |

OTHER PUBLICATIONS

Shinichi Komaba et al., "Higher Energy and Safety of Lithium-Ion Batteries with Ionic Liquid Electrolyte", Proc. of SPIE, Jan. 1, 2010, vol. 7683, pp. 76830E-1-76830E-7 (7 pages total).
An Office Action dated Nov. 26, 2019, which issued during the prosecution of U.S. Appl. No. 15/778,667.
International Search Report of PCT/JP2016/085387 dated Mar. 7, 2017.

* cited by examiner

LITHIUM ION SECONDARY BATTERY

CROSS REFERENCE TO RELATED APPLICATIONS

This application is a National Stage of International Application No. PCT/JP2016/085387 filed Nov. 29, 2016, claiming priority based on Japanese Patent Application No. 2015232736 filed Nov. 30, 2015, the disclosure of which is incorporated herein in its entirety by reference.

TECHNICAL FIELD

The present invention relates to a lithium ion secondary battery, a vehicle using a lithium ion secondary battery, and a method for manufacturing a lithium ion secondary battery.

BACKGROUND ART

Lithium ion secondary batteries have advantages such as high energy density, small self-discharge, excellent long-term reliability and the like, and therefore they have been put into practical use in notebook-type personal computers and mobile phones. More recently, the development of the high performance lithium ion secondary battery excellent in cycle characteristics and further improved in capacity and energy density is demanded due to, in addition to the trend of high functionality of electronic equipment, the expansion of market of motor driven vehicles such as electric vehicles and hybrid vehicles and the acceleration of the development of domestic and industrial power storage systems.

Attention has been drawn to metallic active materials such as silicon, tin and alloys and metal oxides thereof as a negative electrode active material which provides a high capacity lithium ion secondary battery. These metallic negative electrode active materials provide a high capacity, but the expansion and contraction of the active materials are large when lithium ions are absorbed and released. When charge and discharge are repeated, the negative electrode active material particles collapse due to volume change upon the expansion and contraction, and a flesh active surface thereof is exposed to outside. This active surface decomposes electrolyte solvents and degrades the cycle characteristics of the battery. In order to prevent such disintegration of the metallic negative electrode active material particles, it has been proposed to reduce their particle size.

For example, Patent document 1 discloses a preferred particle size of silicon and/or silicon alloys used as a negative electrode active material of the lithium ion secondary battery. According to Patent document 1, it is preferred that the average particle size of the negative electrode active material particles is 20 μm or less because a negative electrode current collector is directly stressed by the volume change of the negative electrode active material particles in charge and discharge and the negative electrode mixture layer is easily peeled off from the negative electrode current collector. On the other hand, when the particle size of the negative electrode active material particles is too small, the surface area of the negative electrode active material particles per unit weight increases, the contact area with the non-aqueous electrolyte solution increases, irreversible reactions increase, and the capacity decreases. For this reason, it is preferred that the average particle size of the negative electrode active material particles is 1 μm or more.

CITATION LIST

Patent Document

Patent Document 1: Japanese patent laid-open No. 2007-242405

SUMMARY OF INVENTION

Technical Problem

As the particle size of the silicon material is smaller, the disintegration of the negative electrode mixture layer can be prevented. However, as described in Patent document 1, when the particle size of the silicon material is too small, there is a problem in that a large surface area thereof easily causes a side reaction between the active material and an electrolyte solvent to occur, and on the contrary, the cycle characteristics of the lithium ion secondary battery decrease. An object of the present invention is to provide a lithium ion secondary battery capable of solving the above problem of insufficient cycle characteristics when a silicon material having a small particle size is used as a negative electrode active material.

Solution to Problem

The lithium ion secondary battery according to the present invention is characterized in that comprising a negative electrode comprising a material comprising silicon as a constituent element and a polyacrylic acid, and an electrolyte solution comprising a fluoroethylene carbonate, wherein a 50% particle size of the material comprising silicon as a constituent element is 2 μm or less.

Advantageous Effect of Invention

According to the present invention, it is possible to improve the cycle characteristics of the lithium ion secondary battery using a material comprising silicon as a constituent element as a negative electrode active material.

DESCRIPTION OF EMBODIMENTS

Figure 1:
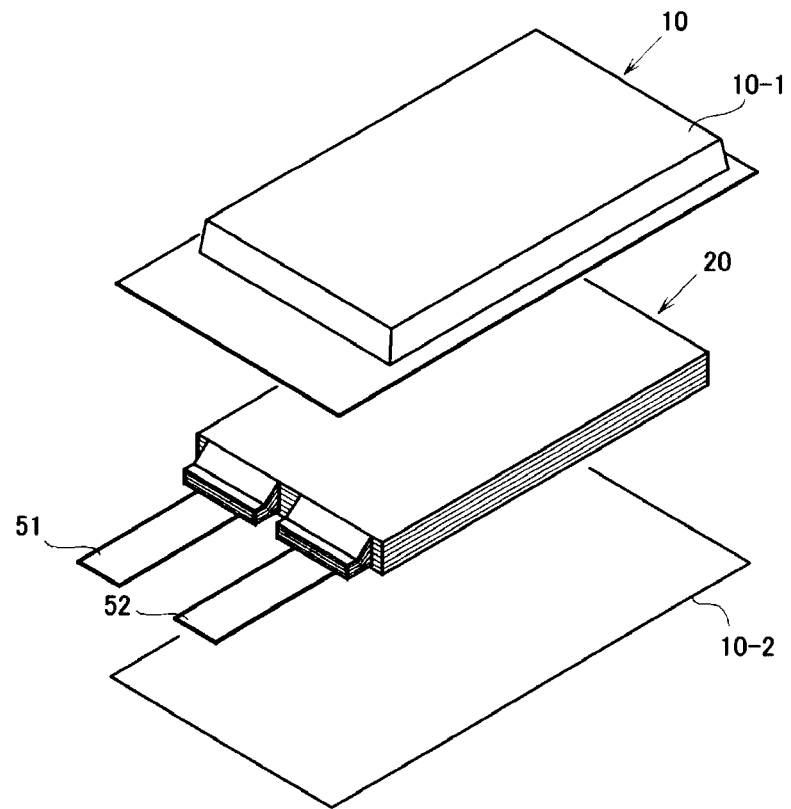
FIG. 1 is an exploded perspective view showing a basic structure of a film package battery.

Each constituent of the lithium ion secondary battery of the present embodiment will be described below.
<Negative Electrode>
As a negative electrode active material, a material comprising silicon as a constitute element (hereafter, this is also referred to as "silicon material") is used. Examples of the silicon material include metal silicon, alloys comprising silicon, silicon oxides denoted by the composition formula, $SiO_x$ ($0<x\geq2$) and the like. The other metals used in the alloy comprising silicon are preferably selected from the group consisting of Li, Al, Ti, Pb, Sn, In, Bi, Ag, Ba, Ca, Hg, Pd, Pt, Te, Zn and La. The upper limit of the content of the silicon material is preferably 70% by mass or less and more preferably 30% by mass or less of the total amount of the negative electrode active material. The lower limit of the content of the silicon material is preferably 5% by mass or more and more preferably 7% by mass or more of the total amount of the negative electrode active material. Herein, the negative electrode active material is a material capable of desorbing and absorbing lithium and does not include materials not desorbing and absorbing lithium, such as binders and the like.

These silicon materials can be used in powder form. In this case, the 50% particle size (median diameter) D50 of the silicon material particles is preferably 2.0 µm or less, more preferably 1.0 µm or less and most preferably 0.5 µm or less. The effect of improving the cycle characteristics according to the present invention can be increased by reducing the particle size. Also, the 50% particle size (median diameter) D50 of the silicon material particles is preferably 1 nm or more. The specific surface area (CS) of the silicone material particles is preferably 1 $m^2/cm^3$ or more, more preferably 5 $m^2/cm^3$ or more, and most preferably 10 $m^2/cm^3$ or more. The specific surface area (CS) of the silicon material particles is preferably 3000 $m^2/cm^3$ or less. Herein, CS (Calculated Specific Surfaces Area, unit: $m^2/cm^3$) means a specific surface area calculated assuming particles as spheres. CS may be calculated by the formula: CS=6/MA, wherein MA represents an average area diameter measured by a laser diffraction type particle size distribution measuring apparatus. The 50% particle size is the median value of a particle size distribution on a volumetric basis. The particle size distribution on a volumetric basis can be measured by a laser diffraction type particle size distribution measuring apparatus.

The silicon material may be used in combination with other negative electrode active materials. Especially, the silicon material is preferably used together with carbon. By using it together with the carbon, it is possible to alleviate the influence of the expansion and shrinkage of the silicon and to improve the cycle characteristics of the battery. A mixture of the silicon material and the carbon may be used, but silicon material particles whose surface is coated with carbon may be also used. Examples of the carbon include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

The negative electrode active materials other than carbon, which can be used in combination with the silicon material, also include metals and metal oxides other than silicon. Examples of the metal include Li, Al, Ti, Pb, Sn, In, Bi, Ag, Ba, Ca, Hg, Pd, Pt, Te, Zn, La, and alloys of two or more of these. Also, these metals or alloys may contain one or more non-metal elements. Examples of the metal oxide include aluminum oxide, tin oxide, indium oxide, zinc oxide, lithium oxide, and composites of these. Also, for example, 0.1 to 5 mass % of one or two or more elements selected from nitrogen, boron, and sulfur can be added to the metal oxide. In this way, the electroconductivity of the metal oxide can be enhanced.

In the present invention, a polyacrylic acid is used as a binder in the negative electrode. Generally, a large amount of the binder is necessary for the active material having a large specific surface area, but the polyacrylic acids demonstrate have high binding ability even in a small amount. For this reason, when a polyacrylic acid is used, the increase in resistance due to the binder is small even for the electrode using the active material having a large specific surface area. In addition, as a result of studies on suppression of decomposition of the electrolytic solvent, it has been found that the decomposition of electrolyte solvent due to a side reaction of the negative electrode active material can be suppressed when a polyacrylic acid is used as the binder. The binder comprising a polyacrylic acid is particularly suitable for the electrode using the active material having a small particle size in view of such a property. The binder comprising a polyacrylic acid is also excellent in reducing the irreversible capacity of the battery and increasing the battery capacity.

The polyacrylic acid comprises a monomer unit based on an ethylenically unsaturated carboxylic acid. Examples of the ethylenically unsaturated carboxylic acid include acrylic acid, methacrylic acid, crotonic acid, maleic acid, fumaric acid, itaconic acid and the like, and one or two or more of these can be used. The content of the monomer unit based on an ethylenically unsaturated carboxylic acid is preferably 50% by mass or more.

In order to improve the bonding strength, a part or all of the carboxylic acid contained in the monomer unit based on an ethylenically unsaturated carboxylic acid may be converted to its carboxylic salt. Examples of the carboxylic salt include alkali metal salts. The alkali metal constituting the salt is preferably sodium or potassium. When the polyacrylic acid comprises the carboxylic acid alkali metal salt, it is preferred that the amount of the alkali metal contained in the polyacrylic acid is 5000 mass ppm or more of the polyacrylic acid. The carboxylic acid salts may contain plural kinds of the alkali metals. In one aspect of the present embodiment, it is preferred that the polyacrylic acid comprises sodium in an amount of 5000 mass ppm or more of the polyacrylic acid and potassium in an amount of 1 mass ppm or more and 5 mass ppm or less of the polyacrylic acid.

The polyacrylic acid is preferably a copolymer. Especially, it is preferred that the polyacrylic acid comprises a monomer unit based on an ethylenically unsaturated carboxylic ester and/or a monomer unit based on an aromatic vinyl in addition to the monomer unit based on an ethylenically unsaturated carboxylic acid. When the polyacrylic acid contains these monomer units, the peel strength between the electrode mixture layer and the current collector can be improved, and therefore, the cycle characteristics of the battery can be improved.

Examples of the ethylenically unsaturated carboxylic ester include acrylic acid esters, methacrylic acid esters, crotonic acid esters, maleic acid esters, fumaric acid esters, itaconic acid esters and the like. Alkyl esters are especially preferred. The content of the monomer unit based on an ethylenically unsaturated carboxylic ester in the polyacrylic acid is preferably 10% by mass or more and 20% by mass or less.

Examples of the aromatic vinyl include styrene, a-methyl styrene, vinyltoluene, divinylbenzene and the like. The content of the monomer unit based on an aromatic vinyl in the polyacrylic acid is preferably 5% by mass or less.

The polyacrylic acid may comprise another monomer unit. Examples of another monomer unit include monomer units based on a compound such as acrylonitrile, a conjugated diene or the like.

The molecular weight of the polyacrylic acid is not particularly limited, but the weight average molecular weight of the polyacrylic acid is preferably 1000 or more, more preferably in the range of 10,000 to 5,000,000 and most preferably in the range of 300,000 to 350,000. When the weight average molecular weight is within the above range, good dispersibility of the active material and the conductive assisting agent can be maintained and excessive increase in slurry viscosity can be suppressed.

The polyacrylic acid can be used in combination with another binder. For example, polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamide imide, and the like can be used. In addition to the above, styrene butadiene rubber (SBR) and the like can be used. These can be used in combination with a thickener such as carboxymethyl cellulose (CMC).

With respect to the ratio of the polyacrylic acid to the total amount of the negative electrode active material, the amount of the polyacrylic acid is preferably 0.1 parts by mass or more and more preferably 0.5 parts by mass based on 100 parts by mass of the negative electrode active material from the viewpoint of sufficient binding strength and suppression of the electrolyte solution decomposition. The amount of the polyacrylic acid is preferably 50 parts by mass or less and more preferably 10 parts by mass or less based on 100 parts by mass of the negative electrode active material from the viewpoint of high energy density.

For the negative electrode, a conductive assisting agent may be added for the purpose of lowering the impedance. Examples of the conductive assisting agent include, flake-like, soot, and fibrous carbon fine particles and the like, for example, carbon black, acetylene black, ketjen black, vapor grown carbon fibers and the like.

As the negative electrode current collector, from the viewpoint of electrochemical stability, aluminum, nickel, copper, silver, and alloys thereof are preferred. As the shape thereof, foil, flat plate, mesh and the like are exemplified.

The negative electrode may be prepared in accordance with a conventional method. In one aspect, the negative electrode is produced by mixing the negative electrode active material, the polyacrylic acid and optionally the conductive assisting agent with a solvent to prepare a slurry, applying it to the negative electrode current collector, and drying. The application can be carried out by a doctor blade method, a die coater method, a CVD method, a sputtering method, or the like.

<Positive Electrode>

The positive electrode active material is not particularly limited as long as it is a material capable of absorbing and desorbing lithium, but from the viewpoint of high energy density, it is preferred to comprise a high capacity compound. Examples of the high capacity compound include lithium nickelate ($LiNiO_2$) and lithium nickel composite oxides in which a part of the Ni of lithium nickelate is replaced by another metal element, and layered lithium nickel composite oxides represented by the following formula (A) are preferred.

$$Li_yNi_{(1-x)}M_xO_2 \quad (A)$$

wherein $0 \le x < 1$, $0 < y \le 1.2$, and M is at least one element selected from the group consisting of Co, Al, Mn, Fe, Ti, and B.

From the viewpoint of high energy density, it is preferred that the content of Ni is high, that is, x is less than 0.5, further preferably 0.4 or less in the formula (A). Examples of such compounds include $Li_\alpha Ni_\beta Co_\gamma Mn_\delta O_2$ ($0 < \alpha \le 1.2$, preferably $1 \le \alpha \le 1.2$, $\beta + \gamma + \delta = 1$, $\beta \ge 0.7$, and $\gamma \le 0.2$) and $Li_\alpha Ni_\beta Co_\gamma Al_\delta O_2$ ($0 < \alpha \le 1.2$, preferably $1 \le \alpha \le 1.2$, $\beta + \gamma + \delta = 1$, $\beta \ge 0.6$, preferably $\beta \ge 0.7$, and $\gamma \le 0.2$) and particularly include $LiNi_\beta Co_\gamma Mn_\delta O_2$ ($0.75 \le \beta \le 0.85$, $0.05 \le \gamma \le 0.15$, and $0.10 \le \delta \le 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0 < \alpha \le 1.2$, preferably $1 \le \alpha \le 1.2$, $\beta + \gamma + \delta = 1$, $0.2 \le \beta \le 0.5$, $0.1 \le \gamma \le 0.4$, and $0.1 \le \delta \le 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0 < x < 2$), $Li_2MnO_3$, and $Li_xMn_{1.5}Ni_{0.5}O_4$ ($0 < x < 2$); $LiCoO_2$ or materials in which a part of the transition metal in this material is replaced by other metal(s); materials in which Li is excessive as compared with the stoichiometric composition in these lithium transition metal oxides; materials having olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable. The positive electrode active materials described above may be used alone or in combination of two or more.

Examples of the positive electrode binder include polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polyacrylic acid, and the like. In addition to the above, styrene butadiene rubber (SBR) and the like can be used. When an aqueous binder such as an SBR emulsion is used, a thickener such as carboxymethyl cellulose (CMC) can also be used. The above positive electrode binders may be mixed and used. The amount of the positive electrode binder is preferably 2 to 10 parts by mass based on 100 parts by mass of the positive electrode active material, from the viewpoint of the binding strength and high energy density that are in a trade-off relation with each other.

For the coating layer containing the positive electrode active material, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the positive electrode current collector, from the viewpoint of electrochemical stability, aluminum, nickel, copper, silver, and alloys thereof are preferred. As the shape thereof, foil, flat plate, mesh and the like are exemplified. In particular, a current collector using aluminum, an aluminum alloy, or iron-nickel-chromium-molybdenum based stainless steel is preferable.

The positive electrode may be prepared by forming a positive electrode mixture layer comprising the positive electrode active material and the positive electrode binder. Examples of a method for forming the positive electrode mixture layer include a doctor blade method, a die coater method, a CVD method, a sputtering method, and the like. It is also possible that, after forming the positive electrode mixture layer in advance, a thin film of aluminum, nickel or an alloy thereof may be formed by a method such as vapor deposition, sputtering or the like to obtain a positive electrode current collector.

<Electrolyte Solution>

The electrolyte solution comprises fluoroethylene carbonate (another name: 4-fluoro-2-oxo-1,3-dioxolane) as an additive. Fluoroethylene carbonate can suppress the decomposition of the electrolyte solvent due to the negative electrode active material. In order to suppress the decomposition of the electrolyte solvent, the content of the fluoroethylene carbonate in the electrolyte solution is preferably 1% by mass or more, more preferably 5% by mass or more, and most preferably 10% by mass or more. In addition, the content of the fluoroethylene carbonate in the electrolyte solution is preferably 50% by mass or less and more preferably 30% by mass or less.

The decomposition reaction between the electrolyte solvent and the silicon material proceeds as the surface area of the silicon material is larger. Therefore, depending on the surface area of the silicon material, the preferred content of the fluoroethylene carbonate in the electrolyte solution varies. As a result of examining this point, the present inventors have found that it is preferred to satisfy the inequality, $A>B\times C/15$, wherein A represents the content of the fluoroethylene carbonate in the electrolyte solution (unit: % by mass), B represents the specific surface area (CS) of the silicon material (unit: $m^2/cm^3$), C represents the content of the silicon material, relative to the total amount of the negative electrode active material (unit: % by mass). The cycle characteristics of the battery can be improved by adjusting the content of the fluoroethylene carbonate and the specific surface area and the content of the silicon material such that they satisfy within the range of the above inequality.

As the electrolyte solvent, a non-aqueous solvent that is stable at the operating potential of the battery is preferable. Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least a part of the hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) or the like is preferably contained.

The non-aqueous solvent may be used alone, or in combination of two or more.

Examples of the supporting salt include lithium salts such as $LiPF_6$, $LiAsF_6$, $LiAlCl_4$, $LiClO_4$, $LiSbF_6$, $LiCF_3SO_3$, $LiC_4F_9SO_3$, $LiC(CF_3SO_2)_3$, and $LiN(CF_3SO_2)_2$. The supporting salts may be used alone or in combination of two or more. From the viewpoint of cost reduction, $LiPF_6$ is preferable.

In addition to the fluoroethylene carbonate, another additive may be added to the electrolyte solution. The additional additive is not particularly limited, and examples thereof include halogenated cyclic carbonates (except for fluoroethylene carbonate), carboxylic anhydrides, unsaturated cyclic carbonates, cyclic or open-chain disulfonic acid esters, and the like. These compounds can further improve the cycle characteristics of the battery. This is presumably because these additives decompose during charge and discharge of the lithium ion secondary battery to form a film on the surface of the electrode active material, which inhibits the decomposition of the electrolyte solution and the supporting salt.

The halogenated cyclic carbonate is a cyclic carbonate in which a part or all of hydrogen(s) of an alkylene group has(have) been substituted to halogen atoms or halogenated alkyls. In one embodiment, it is preferred that the halogenated cyclic carbonate is a fluorinated cyclic carbonate. As the fluorinated cyclic carbonate, compounds prepared by substituting a part or all of hydrogen atom(s) of ethylene carbonate (EC), propylene carbonate (PC), butylene carbonate (BC) or the like with fluorine atoms may be exemplified.

The content of the halogenated cyclic carbonate other than the fluoroethylene carbonate in the electrolyte solution is not particularly limited, but is preferably 0.01% by mass or more and 10% by mass or less. When the content is 0.01% by mass or more, a sufficient film forming effect can be obtained. When the content is 10% by mass or less, gas generation due to decomposition of the halogenated cyclic carbonate itself can be suppressed.

Examples of the carboxylic anhydride include cyclic saturated acid anhydrides such as succinic anhydride, glutaric anhydride and adipic anhydride; maleic anhydride and derivatives thereof such as maleic anhydride, methylmaleic anhydride, ethylmaleic anhydride, 3,4-dimethylmaleic anhydride and 3,4-diethylmaleic anhydride; succinic anhydride derivatives such as itaconic anhydride and vinylsuccinic anhydride; and the like.

The content of the carboxylic anhydride in the electrolyte solution is not particularly limited, but is preferably 0.01% by mass or more and 10% by mass or less. When the content is 0.01% by mass or more, a sufficient film forming effect can be obtained. When the content is 10% by mass or less, gas generation due to decomposition of the carboxylic anhydride itself can be suppressed.

The unsaturated cyclic carbonate is a cyclic carbonate having at least one carbon-carbon unsaturated bond in the molecule. Examples of the unsaturated cyclic carbonate include vinylene carbonate compounds such as vinylene carbonate, methyl vinylene carbonate, ethyl vinylene carbonate, 4,5-dimethyl vinylene carbonate and 4,5-diethyl vinylene carbonate; and vinyl ethylene carbonate compounds such as 4-vinyl ethylene carbonate, 4-methyl-4-vinyl ethylene carbonate, 4-ethyl-4-vinyl ethylene carbonate, 4-n-propyl-4-vinylene ethylene carbonate, 5-methyl-4-vinyl ethylene carbonate, 4,4-divinyl ethylene carbonate, 4,5-divinyl ethylene carbonate, 4, 4-dimethyl-5-methylene ethylene carbonate, 4, 4-diethyl-5-methylene ethylene carbonate.

The content of the unsaturated cyclic carbonate in the electrolyte solution is not particularly limited, but is preferably 0.01% by mass or more and 10% by mass or less. When the content is 0.01% by mass or more, a sufficient film forming effect can be obtained. When the content is 10% by mass or less, gas generation due to decomposition of the unsaturated cyclic carbonate itself can be suppressed.

As the cyclic or open-chain disulfonic acid ester, for example, a cyclic disulfonic acid ester represented by the following formula (C) or an open-chain disulfonic acid ester represented by the following formula (D) may be exemplified.

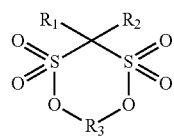

(C)

In the formula (C), $R_1$ and $R_2$ are each independently a substituent group selected from the group consisting of a hydrogen atom, an alkyl group having 1 to 5 carbon atoms, a halogen group and an amino group. $R_3$ is an alkylene group having 1 to 5 carbon atoms, a carbonyl group, a sulfonyl group, a fluoroalkylene group having 1 to 6 carbon atoms, or a divalent group having 2 to 6 carbon atoms in which an alkylene unit or a fluoroalkylene unit are bonded through an ether group.

In the formula (C), $R_1$ and R2 are preferably each independently a hydrogen atom, an alkyl group having 1 to 3 carbon atoms or a halogen group, and $R_3$ is more preferably an alkylene group or a fluoroalkylene group having 1 or 2 carbon atoms.

Preferred examples of the cyclic disulfonic acid ester represented by the formula (C) include, but are not limited to, the compounds denoted by the following formulae (1) to (20).

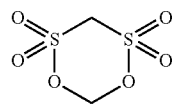

(1)

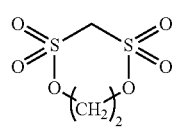

(2)

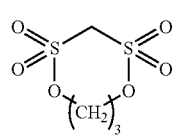

(3)

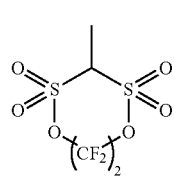

(4)

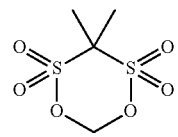

(5)

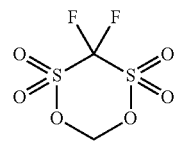

(6)

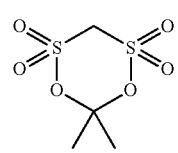

(7)

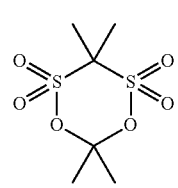

(8)

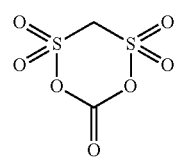

(9)

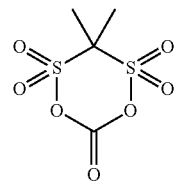

(10)

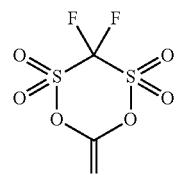

(11)

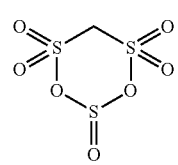

(12)

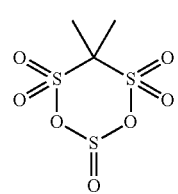

(13)

-continued

(14)
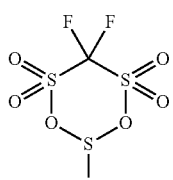

(15)
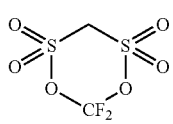

(16)
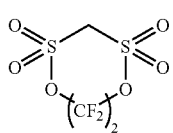

(17)
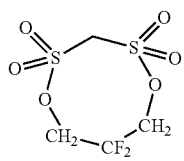

(18)
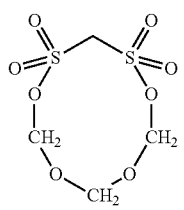

(19)
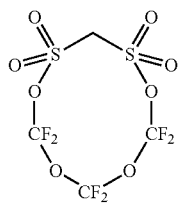

(20)
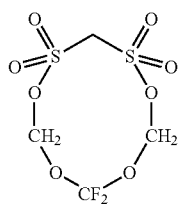

(D)
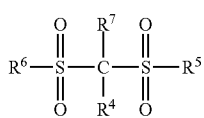

In the formula (D), $R^4$ and $R^7$ each independently represent an atom or a group selected from a hydrogen atom, an alkyl group having 1 to 5 carbon atoms, an alkoxy group having 1 to 5 carbon atoms, a fluoroalkyl group having 1 to 5 carbon atoms, a polyfluoroalkyl group having 1 to 5 carbon atoms, —$SO_2X_3$ ($X_3$ is an alkyl group having 1 to 5 carbon atoms), —$SY_1$ ($Y_1$ is an alkyl group having 1 to 5 carbon atoms), —COZ (Z is a hydrogen atom or an alkyl group having 1 to 5 carbon atoms), and a halogen atom. $R^5$ and $R^6$ each independently represent an atom or a group selected from an alkyl group having 1 to 5 carbon atoms, an alkoxy group having 1 to 5 carbon atoms, a phenoxy group, a fluoroalkyl group having 1 to 5 carbon atoms, a polyfluoroalkyl group having 1 to 5 carbon atoms, a fluoroalkoxy group having 1 to 5 carbon atoms, a polyfluoroalkoxy group having 1 to 5 carbon atoms, a hydroxyl group, a halogen atom, —$NX_4X_5$ ($X_4$ and $X_5$ each independently represent a hydrogen atom or an alkyl group having 1 to 5 carbon atoms), and —$NY_2CONY_3Y_4$ ($Y_2$ to $Y_4$ each independently represent a hydrogen atom or an alkyl group having 1 to 5 carbon atoms).

In the formula (D), $R^4$ and $R^7$ are preferably each independently a hydrogen atom, an alkyl group having 1 or 2 carbon atoms, a fluoroalkyl group having 1 or 2 carbon atoms, or a halogen atom, and $R^5$ and $R^6$ are more preferably each independently an alkyl group having 1 to 3 carbon atoms, an alkoxy group having 1 to 3 carbon atoms, a fluoroalkyl group having 1 to 3 carbon atoms, a hydroxyl group or a halogen atom.

Preferred examples of the open-chain disulfonic acid ester represented by the formula (D) include, but are not limited to, the compounds denoted by the following formulae.

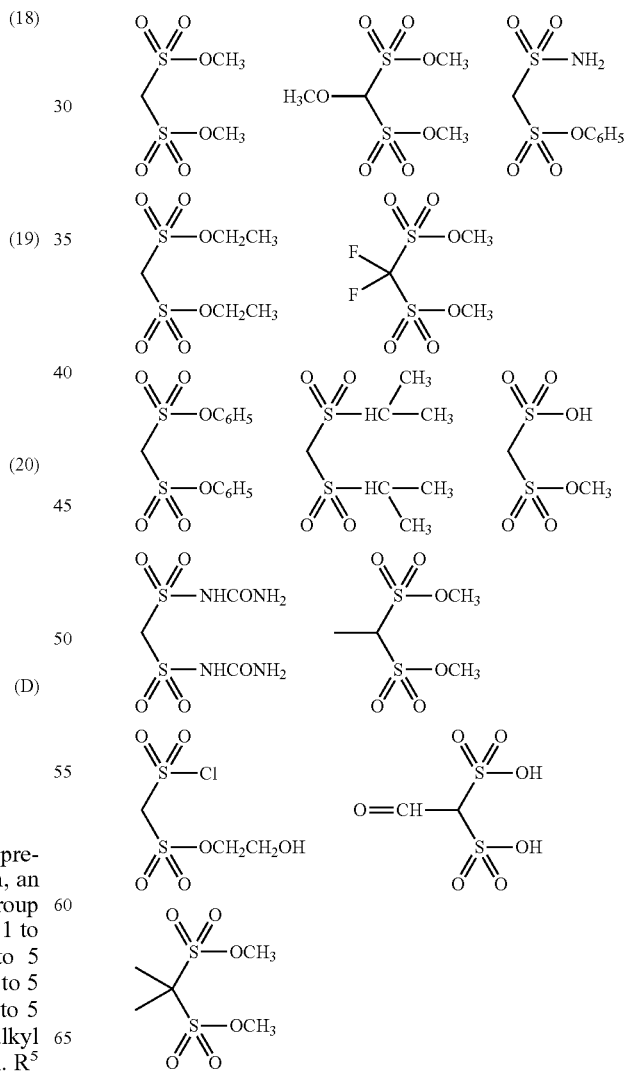

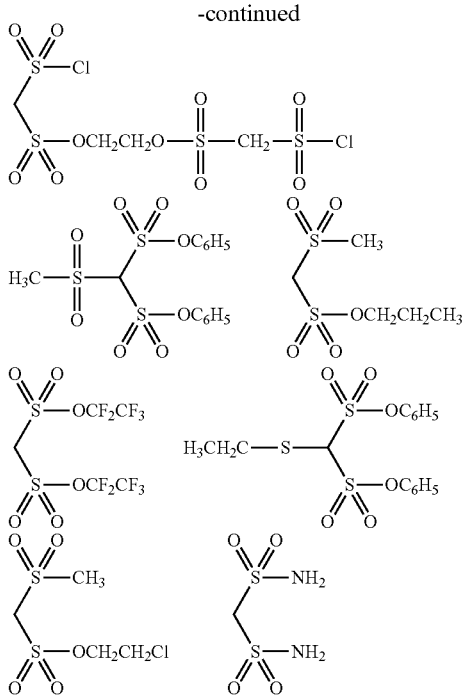

The content of the cyclic or open-chain disulfonic acid ester in the electrolyte solution is preferably 0.01% by mass or more and 10% by mass or less. When the content is 0.01% by mass or more, a sufficient film effect can be obtained. When the content is 10% by mass or less, an increase in the viscosity of the electrolyte solution and an increase in resistance associated therewith can be suppressed.

<Separator>

The separator may be of any type as long as it suppresses electron conduction between the positive electrode and the negative electrode, does not inhibit the permeation of charged substances, and has durability against the electrolyte solution. Specific examples of the material include polyolefins such as polypropylene and polyethylene, cellulose, polyethylene terephthalate, polyimide, polyvinylidene fluoride, and aromatic polyamides (aramid) such as polymetaphenylene isophthalamide, polyparaphenylene terephthalamide and cop olyparaphenylene 3,4'-oxydiphenylene terephthalamide, and the like. These can be used as porous films, woven fabrics, nonwoven fabrics or the like.

<Insulation Layer>

An insulation layer may be formed on at least one surface of the positive electrode, the negative electrode and the separator. Examples of a method for forming the insulation layer include a doctor blade method, a dip coating method, a die coater method, a CVD method, a sputtering method, and the like. The insulation layer may be formed at the same time as forming the positive electrode, negative electrode or separator. Materials constituting the insulation layer include a mixture of aluminum oxide, barium titanate or the like and SBR or PVDF.

<Structure of Secondary Battery>

Figure 2:
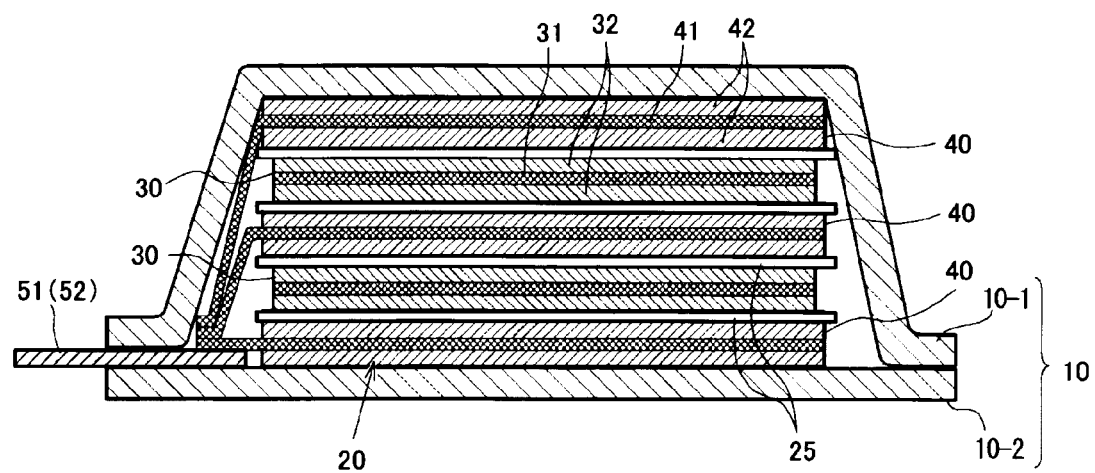
FIG. 2 is a cross-sectional view schematically showing a cross section of the battery of FIG. 1.

The lithium ion secondary battery according to the present embodiment may be, for example, a secondary battery having a structure as shown in FIGS. 1 and 2. This lithium ion secondary battery comprises a battery element 20, a film package 10 housing the battert element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the lithium ion secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Lithium Ion Secondary Battery>

The lithium ion secondary battery according to the present embodiment can be manufactured by a conventional method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the lithium ion secondary battery.

<Assembled Battery>

A plurality of the lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacitance and voltage freely. The number of lithium ion secondary batteries included in the assembled battery can be set appropriately according to the battery capacity and output.

<Vehicle>

The lithium ion secondary battery or the assembled battery according to the present embodiment can be used in vehicles. Vehicles according to the present embodiment include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

EXAMPLE

Hereafter, an embodiment of the present invention will be explained in details by using examples, but the present invention is not limited to these examples.

Example 1

(Negative Electrode)

As a negative electrode active material, a graphite and an alloy of Si and Ti (hereafter, it is abbreviated as Si alloy in some cases) were used. The 50% particle size of the alloy of Si and Ti was 0.5 μm. The specific surface area (CS) of the alloy of Si and Ti was 15 m$^2$/cm$^3$. The mass ratio of the graphite and the alloy of Si and Ti was 93:7. This negative electrode active material, acetylene black as a conductive assisting agent, and a negative electrode binder consisting of a polymer prepared from an unsaturated carboxylic acid monomer, an unsaturated carboxylic acid sodium salt monomer, a conjugated diene monomer and an ethylenically unsaturated carboxylic ester were weighed at a mass ratio of 96:1:3. Then, these were mixed with water to prepare a negative electrode slurry. After applied on a copper foil having a thickness of 10 μm, the negative electrode slurry was dried and further heat-treated at 100° C. under vacuum to prepare a negative electrode.

(Positive Electrode)

As a positive electrode active material, $LiNi_{0.8}Co_{0.15}Al_{0.05}O_2$ was used. This positive electrode active material, carbon black as a conductive assisting agent, and polyvinylidene fluoride as a positive electrode binder were weighed at a mass ratio of 90:5:5. Then, these were mixed with N-methylpyrrolidone to prepare a positive electrode slurry. After applied on an aluminum foil having a thickness of 20 μm, the positive electrode slurry was dried and further pressed to prepare a positive electrode.

(Electrode Stack)

The obtained three layers of the positive electrodes and four layers of the negative electrodes were stacked alternately via an aramid porous film as a separator. The end portions of the positive electrode current collectors that were not covered with the positive electrode active material and the end portions of the negative electrode current collectors that were not covered with the negative electrode active material were welded individually. Further, to the welding positions, an aluminum positive electrode terminal and a nickel negative electrode terminal were welded respectively, to obtain an electrode stack having a planar stacked structure.

(Electrolyte Solution)

A mixed solvent of Ethylene carbonate (EC) and diethyl carbonate (DEC) (volume ratio: EC/DEC=30/70) was used as a solvent for non-aqueous electrolyte solution, and $LiPF_6$ was dissolved as a supporting salt so that the concentration in the electrolyte solution becomes 1M. Fluoroethylene carbonate (FEC) was added as an additive so that the amount in the electrolyte solution becomes 10% by mass, to prepare an aqueous electrolyte solution.

(Secondary Battery)

The electrode stack was accommodated in an aluminum laminate film as an outer package, and then the electrolyte solution was injected inside the outer package. Thereafter, the outer package was sealed while the pressure was reduced to 0.1 atm, to prepare a secondary battery.

(Evaluation)

The fabricated secondary battery was subjected to a test in which charge and discharge was repeated in the voltage range of 2.5 V to 4.2 V in a thermostat kept at 45° C., and evaluated for the capacity retention ratio. In the charge, the secondary battery was charged at 1 C to 4.2 V and then subjected to constant voltage charge for 2.5 hours in total. In the discharge, the secondary battery was subjected to constant current discharge at 1 C to 2.5 V. The "capacity retention ratio (%)" was calculated by (discharge capacity after 150 cycles)/(discharge capacity after 1 cycle)×100 (unit: %). The results are shown in Table 1.

Examples 2 to 8

The batteries were fabricated respectively in the same manner as in Example 1 except that the elements (A) to (E) related to the negative electrode active material or the electrolyte solution were changed as in Table 1. The capacity retention ratios after 150 cycles of the fabricated batteries were obtained in the same manner as in Example 1. The results are shown in Table 1.

Example 9 to 12

As described in Table 1, electrolyte solutions comprising fluoroethylene carbonate and the second additive were used. The second additive and its concentration were as in Table 1. The other constitution was the same as the constituent of Example 1, and the batteries were fabricated respectively. The capacity retention ratios after 150 cycles of the fabricated batteries were obtained in the same manner as in Example 1. The results are shown in Table 1.

Comparative Example 1

The batteries were fabricated in the same manner as in Examples 1 except that the elements (A) to (E) related to the negative electrode active material or the electrolyte solution were changed as in Table 1. The capacity retention ratio after 150 cycles of the fabricated battery was obtained in the same manner as in Example 1. The results are shown in Table 1.

Comparative Example 2

As described in Table 1, SBR as a binder and CMC as a thickener were used in the negative electrode. The negative electrode active material, the conductive assisting agent and the negative electrode binder were weighed at 96:1:3, and theses were mixed with 1% by mass of CMC aqueous solution to prepare a negative electrode slurry. The other constitution was the same as the constituent of Example 1, and the battery was fabricated. The capacity retention ratio after 150 cycles of the fabricated battery was obtained in the same manner as in Example 1. The results are shown in Table 1.

Comparative Examples 3 and 4

The batteries were fabricated respectively in the same manner as in Examples 1 except that the elements (A) to (E) related to the negative electrode active material or the electrolyte solution were changed as in Table 1. As the element (A), that is, the ratio of the Si alloy in the active material was 0, only graphite was used in the negative electrode active material. The capacity retention ratios after 150 cycles of the fabricated batteries were obtained in the same manner as in Example 1. The results are shown in Table 1.

Reference Examples 1 and 2

The batteries were fabricated respectively in the same manner as in Examples 1 except that the elements (A) to (E) related to the negative electrode active material or the electrolyte solution were changed as in Table 1. The capacity retention ratios after 150 cycles of the fabricated batteries were obtained in the same manner as in Example 1. The results are shown in Table 1.

INDUSTRIAL APPLICABILITY

The lithium ion secondary battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE 10 film package
20 battery element
25 separator
30 positive electrode
40 negative electrode

TABLE 1

| | (A) Ratio of Si alloy in active materials wt % | (B) 50% diameter of Si alloy μm | (C) Binder | (D) Specific surface area (CS) of Si alloy m²/cm³ | (E) Concentration of FEC wt % | (F) Second additive | (G) Concentration of second additive wt % | (H) (A) × (D)/15 | (I) Capacity retention ratio after 150 cycles % |
|---|---|---|---|---|---|---|---|---|---|
| Example 1 | 7 | 0.5 | PAA | 15 | 10 | | | 7.0 | 75.4 |
| Example 2 | 7 | 0.5 | PAA | 15 | 20 | | | 7.0 | 75.6 |
| Example 3 | 7 | 1 | PAA | 7 | 10 | | | 3.3 | 74.5 |
| Example 4 | 7 | 1 | PAA | 7 | 5 | | | 3.3 | 74 |
| Example 5 | 7 | 1.5 | PAA | 5 | 10 | | | 2.3 | 73.8 |
| Example 6 | 7 | 1.5 | PAA | 5 | 5 | | | 2.3 | 71.5 |
| Example 7 | 7 | 2 | PAA | 3 | 10 | | | 1.4 | 70 |
| Example 8 | 15 | 0.5 | PAA | 15 | 20 | | | 15.0 | 68.9 |
| Example 9 | 7 | 0.5 | PAA | 15 | 10 | MMDS | 0.5 | 7.0 | 80.1 |
| Example 10 | 7 | 0.5 | PAA | 15 | 10 | MA | 0.5 | 7.0 | 81.3 |
| Example 11 | 7 | 0.5 | PAA | 15 | 10 | EGA | 1.9 | 7.0 | 79.5 |
| Example 12 | 7 | 0.5 | PAA | 15 | 10 | SA | 0.5 | 7.0 | 82.0 |
| Comparative example 1 | 7 | 2.5 | PAA | 5 | 10 | | | 2.3 | <20 |
| Comparative example 2 | 7 | 0.5 | SBR + CMC | 15 | 10 | | | 7.0 | <20 |
| Comparative example 3 | 0 | | PAA | | 10 | | | | 95 |
| Comparative example 4 | 0 | | PAA | | 2 | | | | 95 |
| Reference example 1 | 7 | 0.5 | PAA | 15 | 5 | | | 7.0 | <20 |
| Reference example 2 | 20 | 0.5 | PAA | 15 | 10 | | | 20.0 | <20 |

The meanings of the abbreviations used in Table 1 are as follows.
PAA: polyacrylic acid
SBR: styrene butadiene rubber
CMC: carboxymethyl cellulose
FEC: fluoroethylene carbonate
MMDS: methylene methanedisulfonate
MA: maleic anhydride
FGA: hexafluoroglutaric anhydride
SA: succinic anhydride While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A lithium ion secondary battery comprising a negative electrode comprising a material comprising silicon and a polyacrylic acid, and an electrolyte solution comprising a fluoroethylene carbonate, wherein a 50% particle size of the material comprising silicon is 2μm or less, the polyacrylic acid comprises a monomer unit based on an ethylenically unsaturated carboxylic acid, and a monomer unit based on an ethylenically unsaturated carboxylic ester and/or a monomer unit based on a aromatic vinyl, and the material comprising silicon is selected from the group consisting of metal silicon, alloys comprising silicon, and silicon oxides.

2. The lithium ion secondary battery according to claim 1, wherein a specific surface area (CS) of the material comprising silicon is 5 m$^2$/cm$^3$ or more.

3. The lithium ion secondary battery according to claim 1, wherein a content of the material comprising silicon is 5% by mass or more based on a total amount of a negative electrode active material.

4. The lithium ion secondary battery according to claim 1, wherein the electrolyte solution comprises at least one additive selected from the group consisting of halogenated cyclic carbonates except for the fluoroethylene carbonate, carboxylic anhydrides, unsaturated cyclic carbonates, cyclic disulfonic acid esters, and open chain disulfonic acid esters.

5. The lithium ion secondary battery according to claim 1, which satisfies inequality: A >B x C /15, wherein A represents a concentration of the fluoroethylene carbonate in the electrolyte solution (unit: % by mass), B represents the specific surface area (CS) of the material comprising silicon (unit: m$^2$/cm$^3$), and C represents the content of the material comprising silicon based on the total amount of the negative electrode active material (unit: % by mass).

6. A vehicle comprising the lithium ion secondary battery according to claim 1.

7. The lithium ion secondary battery according to claim 1, wherein the negative electrode comprises a graphite, and the polyacrylic acid binds the material comprising silicon to the graphite.

8. The lithium ion secondary battery according to claim 1, wherein a content of the silicon material in the negative electrode active material is 5% by mass or more and 30% by mass or less, and a content of the fluoroethylene carbonate in the electrolyte solution is 5% by mass or more and 30% by mass or less.

9. The lithium ion secondary battery according to claim 8, wherein the 50% particle size of the material comprising silicon is 0.5 μm or more and 2 μm or less.

10. The lithium ion secondary battery according to claim 9, wherein the polyacrylic acid comprises a monomer unit based on a conjugated diene and a monomer unit based on an ethylenically unsaturated carboxylic acid alkali metal salt.

11. The lithium ion secondary battery according to claim 10, wherein the material comprising silicon is an alloy comprising silicon.

12. The lithium ion secondary battery according to claim 11, wherein the battery comprises a positive electrode comprising a layered lithium nickel composite oxide represented by formula:

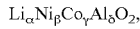

wherein 1 ≤α≤1.2, β≥0.7, γ≥0.2, and β+γ+δ=1.

13. The lithium ion secondary battery according to claim 12, wherein the electrolyte solution comprises ethylene carbonate, diethyl carbonate and LiPF$_6$.

14. A method for manufacturing a lithium ion secondary battery, comprising the steps of:

fabricating an electrode element by stacking a positive electrode and a negative electrode via a separator, and encapsulating the electrode element and an electrolyte solution into an outer package, wherein the electrolyte solution comprises a fluoroethylene carbonate, and the negative electrode comprises a material comprising silicon and a polyacrylic acid, wherein a 50% particle size of the material comprising silicon is 2μm or less, the polyacrylic acid comprises a monomer unit based on an ethylenically unsaturated carboxylic acid, and a monomer unit based on an ethylenically unsaturated carboxylic ester and/or a monomer unit based on an aromatic vinyl, and the material comprising silicon is selected from the group consisting of metal silicon, alloys comprising silicon, and silicon oxides.

* * * * *

UNITED STATES PATENT AND TRADEMARK OFFICE
CERTIFICATE OF CORRECTION

PATENT NO. : 10,756,337 B2  
APPLICATION NO. : 15/779660  
DATED : August 25, 2020  
INVENTOR(S) : Ikiko Shimanuki et al.

Page 1 of 2

It is certified that error appears in the above-identified patent and that said Letters Patent is hereby corrected as shown below:

On the Title Page

Page 2, Column 2, Foreign Patent Documents, Line 11; After "7/2006", delete "¶WO 2013/161786 A1 7/2006"

In the Specification

Column 1, Cross Reference to Related Applications, Line 10; Delete "2015232736" and insert --2015-232736-- therefor Column 8, Description of Embodiments, Line 4; After "LiClO$_4$,", insert --LiBF$_4$,--

Column 8, Description of Embodiments, Line 66; Delete "4, 4-dimethyl-5-methylene" and insert --4,4-dimethyl-5-methylene-- therefor Column 8, Description of Embodiments, Line 67; Delete "4, 4-diethyl-5-methylene" and insert --4,4-diethyl-5-methylene-- therefor Column 9, Description of Embodiments, Line 33; Delete "R2" and insert --R$_2$-- therefor Column 9, Description of Embodiments, Eq. (4); Delete " 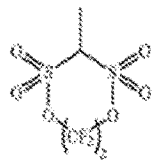 " and insert -- 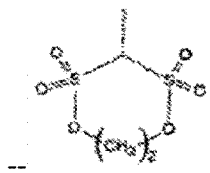 -- therefor Signed and Sealed this  
Fifteenth Day of December, 2020

Andrei Iancu  
*Director of the United States Patent and Trademark Office*

CERTIFICATE OF CORRECTION (continued)
U.S. Pat. No. 10,756,337 B2

Column 13, Description of Embodiments, Line 45; Delete "cop olyparaphenylene" and insert --copolyparaphenylene-- therefor Column 13, Description of Embodiments, Line 64; Delete "battert" and insert --battery-- therefor In the Claims Column 20, Line 19; In Claim 12, delete "$\beta \geq 0.7, \gamma \geq 0.2$," and insert --$\beta \geq 0.7, \gamma \leq 0.2$,-- therefor